(12) United States Patent
Gonzales, Jr.

(10) Patent No.: US 11,112,867 B2
(45) Date of Patent: Sep. 7, 2021

(54) SURFACING RELATED CONTENT BASED ON USER INTERACTION WITH CURRENTLY PRESENTED CONTENT

(71) Applicant: PayPal, Inc., San Jose, CA (US)

(72) Inventor: Sergio Pinzon Gonzales, Jr., San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/674,754

(22) Filed: Nov. 5, 2019

(65) Prior Publication Data

US 2020/0201429 A1 Jun. 25, 2020

Related U.S. Application Data

(63) Continuation of application No. 14/313,938, filed on Jun. 24, 2014, now Pat. No. 10,466,776.

(51) Int. Cl.
| | | |
|---|---|---|
| *G06F 3/01* | (2006.01) | |
| *G02B 27/00* | (2006.01) | |
| *G06F 3/0483* | (2013.01) | |
| *G06F 16/435* | (2019.01) | |

(52) U.S. Cl.
CPC ......... *G06F 3/013* (2013.01); *G02B 27/0093* (2013.01); *G06F 3/0483* (2013.01); *G06F 16/435* (2019.01)

(58) Field of Classification Search
None
See application file for complete search history.

(56) References Cited

U.S. PATENT DOCUMENTS

| | | | | |
|---|---|---|---|---|
| 2006/0026535 A1* | 2/2006 | Hotelling | ............ | G06F 3/04883 715/863 |
| 2008/0025529 A1* | 1/2008 | Keohane | ................. | G06F 3/165 381/104 |
| 2008/0209343 A1* | 8/2008 | Macadaan | ............. | G06F 3/0482 715/747 |
| 2012/0209987 A1* | 8/2012 | Rhinelander | .......... | G06Q 30/02 709/224 |
| 2014/0207518 A1* | 7/2014 | Kannan | .............. | G06Q 30/0201 705/7.29 |

\* cited by examiner

*Primary Examiner* — Matthew Yeung

(57) ABSTRACT

A method and system for, at an electronic device with one or more processors, presenting a media content item on an electronic display. The electronic device detects a user action with a respective portion of the media content item, wherein the user action does not include explicit selection of the respective portion of the media content item. In response to detection of the user action, the electronic device identifying additional content to present based on the content included in the portion of the respective portion of the media content item. The electronic device then simultaneously presents the additional content and the media content item on the electronic display.

20 Claims, 17 Drawing Sheets

ELECTRONIC DEVICE

POLAR BEARS
THE POLAR BEAR (URSUS MARITIMUS) IS A CARNIVOROUS BEAR WHOSE NATIVE RANGE LIES LARGELY WITHIN THE ARCTIC CIRCLE, ENCOMPASSING THE ARCTIC OCEAN, ITS SURROUNDING SEAS AND SURROUNDING LAND MASSES. IT IS A LARGE BEAR, APPROXIMATELY THE SAME SIZE AS THE OMNIVOROUS KODIAK BEAR (URSUS ARCTOS MIDDENDORFFI). A BOAR (ADULT MALE) WEIGHS AROUND 350–700 KG (770–1,540 LB), WHILE A SOW (ADULT FEMALE) IS ABOUT HALF THAT SIZE. ALTHOUGH IT IS THE SISTER SPECIES OF THE BROWN BEAR, IT HAS EVOLVED TO OCCUPY A NARROWER ECOLOGICAL NICHE, WITH MANY BODY CHARACTERISTICS ADAPTED FOR COLD TEMPERATURES, FOR MOVING ACROSS SNOW, ICE, AND OPEN WATER, AND FOR HUNTING THE SEALS WHICH MAKE UP MOST OF ITS DIET.
    ALTHOUGH MOST POLAR BEARS ARE BORN ON LAND, THEY SPEND MOST OF THEIR TIME AT SEA. THEIR SCIENTIFIC NAME MEANS "MARITIME BEAR", AND DERIVES FROM THIS FACT. POLAR BEARS HUNT THEIR PREFERRED FOOD OF SEALS FROM THE EDGE OF SEA ICE, OFTEN LIVING OFF FAT RESERVES WHEN NO SEA ICE IS PRESENT.

Page 1

FIGURE 3

ELECTRONIC DEVICE

HUNTING AND DIET

A WIDESPREAD LEGEND TELLS THAT POLAR BEARS COVER THEIR BLACK NOSES WITH THEIR PAWS WHEN HUNTING. THIS BEHAVIOR, IF IT HAPPENS, IS RARE – ALTHOUGH THE STORY EXISTS IN NATIVE ORAL HISTORY AND IN ACCOUNTS BY EARLY ARCTIC EXPLORERS, THERE IS NO RECORD OF AN EYEWITNESS ACCOUNT OF THE BEHAVIOR IN RECENT DECADES.

READ MORE ABOUT EARLY ARCTIC EXPLORERS

MATURE BEARS TEND TO EAT ONLY THE CALORIE-RICH SKIN AND BLUBBER OF THE SEAL, WHEREAS YOUNGER BEARS CONSUME THE PROTEIN-RICH RED MEAT.[57] STUDIES HAVE ALSO PHOTOGRAPHED POLAR BEARS SCALING NEAR-VERTICAL CLIFFS, TO EAT BIRDS' CHICKS AND EGGS.[61] FOR SUBADULT BEARS WHICH ARE INDEPENDENT OF THEIR MOTHER BUT HAVE NOT YET GAINED ENOUGH EXPERIENCE AND BODY SIZE TO SUCCESSFULLY HUNT SEALS, SCAVENGING THE CARCASSES FROM OTHER BEARS' KILLS IS AN

PAGE 2

FIGURE 5

SURFACING RELATED CONTENT BASED ON USER INTERACTION WITH CURRENTLY PRESENTED CONTENT

CROSS-REFERENCE TO RELATED APPLICATIONS

This application is a continuation of U.S. patent application Ser. No. 14/313,938, filed on Jun. 24, 2014, now U.S. Pat. No. 10,466,776, issued on Nov. 5, 2019; the disclosure of which is incorporated herein by reference in its entirety.

TECHNICAL FIELD

This application relates generally to the field of computer technology and, in a specific example implementation, to a system and method for selecting and displaying additional content to a user.

BACKGROUND

Electronic devices have revolutionized how media content is produced and consumed. Specifically, modern electronic devices have drastically simplified the process for creating, transferring, and consuming all kinds of data. This is possible because data can be stored in a digital form that is easy to create, edit, transfer, and present.

Additionally, digital media can be dynamically altered to improve the user experience and allow advertisers to reach potential customers more effectively. For example, websites often include areas that can be filled with advertisements such as banner ads that can be added to the webpage at the time the webpage is requested. However, users often find banner advertisements annoying and not related to their interests.

BRIEF DESCRIPTION OF THE DRAWINGS

The present description is illustrated by way of example, and not by way of limitation, in the figures of the accompanying drawings in which:

FIG. 3 illustrates an exemplary user interface of a client device presenting an electronic document (e-book).

FIG. 5 illustrates an exemplary user interface of a client device presenting an electronic document (e-book).

Like reference numerals refer to corresponding parts throughout the drawings.

DETAILED DESCRIPTION

Figure 1:
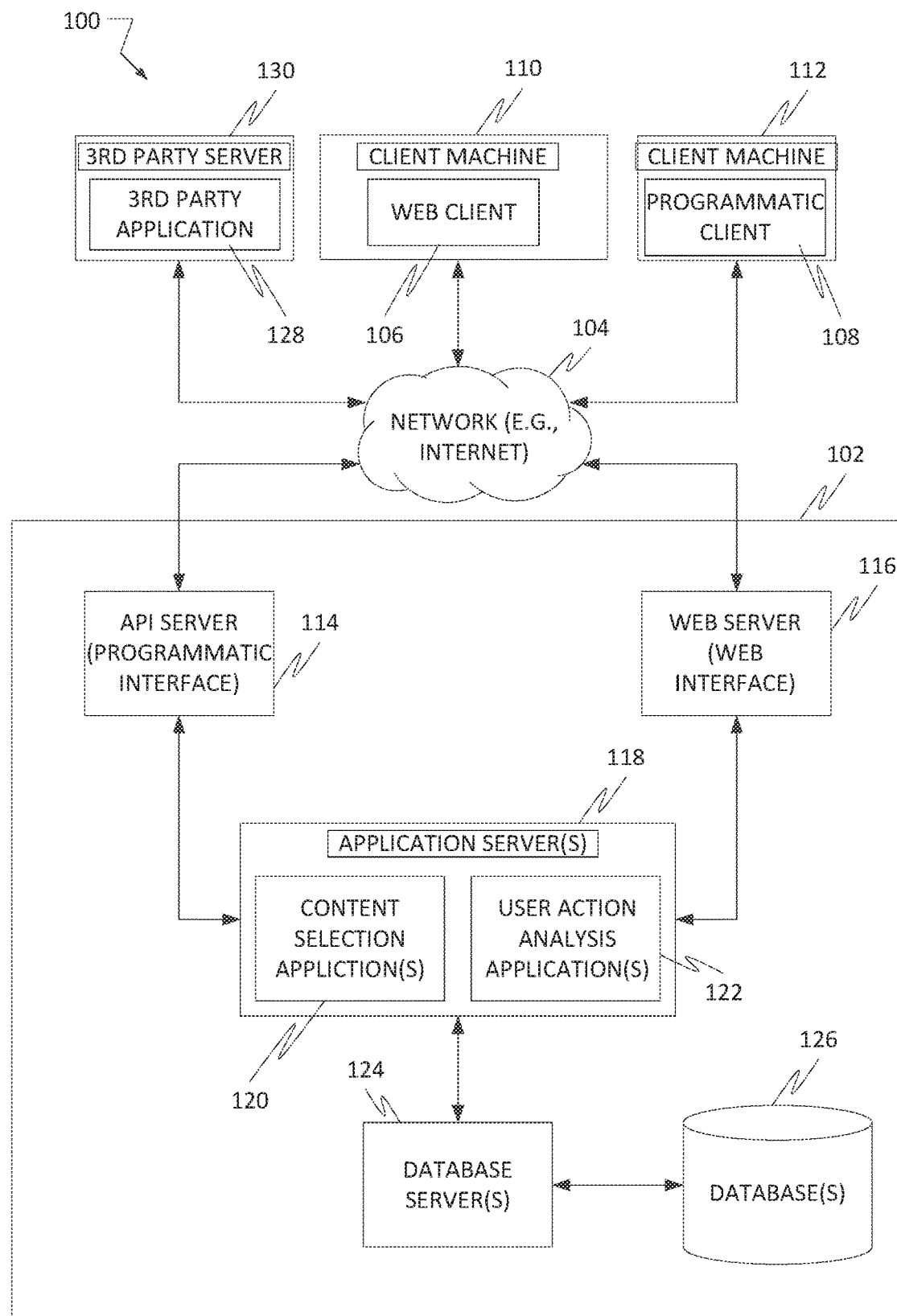
FIG. 1 is a network diagram depicting a client-server system, within which one example implementation may be deployed.

Although the implementations have been described with reference to specific example implementations, it will be evident that various modifications and changes may be made to these implementations without departing from the broader spirit and scope of the description. Accordingly, the specification and drawings are to be regarded in an illustrative rather than a restrictive sense.

In various implementations, methods and systems for surfacing related content based on user interactions with the currently presented content are described. A media content item is presented on an electronic device. Media content items include, but are not limited to, textual content (e.g., an e-book, an electronic magazine, a website, etc.), video content (e.g., a movie, television show, animation, web clip, etc.), audio content (e.g., a music file or a podcast), an image, a video game, or any other media type. Media content items can be presented on an electronic device, such as a display device for visual media like images, text, or video. Audio media content items, such as music or podcasts, can be presented though speakers, earphones, and the like.

When a media content item (e.g., a video, an audio clip, a digital book or e-book, or a video game or other animation) is presented at an electronic device, the user of the electronic device is able to take actions in relation to the presented media content item. In some implementations only a portion of a media content item is displayed at any given time (e.g., one page of a book or a frame of a movie). Some user actions include an interaction with a specific portion of the display section of the media content item (e.g., the user can click on a particular word in an e-book for a definition, right-click on an image to save it, or hover a cursor over a particular section or the rewind a video or audio presentation to repeat a particular section of a media content item.) Other user actions do not include direct user interaction with a specific portion of the presented media content item (e.g., a user looking at a portion of the display, turning up the volume during a particular section of a podcast, turning an e-book page or ceasing to walk while reading an article in a digital magazine.)

In some implementations the electronic device detects the user action. For example, the electronic device includes a camera capable of tracking the positions of the user's eyes and then calculating the part of the display that the user is currently focused on. In other examples the electronic device detects direct input from a user, such as a mouse click input or a detected finger gesture on a touch screen. The electronic device can also measure motion of the device, through either an accelerometer or a global positioning system (GPS) device.

Once user action has been detected, the electronic device determines whether the detected user action selects a particular part of the currently presented portion of the media content item. For example, a mouse click selects the particular part of the currently presented portion of the media content item associated with the location of the mouse click. In contrast, a page turn gesture causes the section of the media content item that is currently displayed to change, but does not select a particular part of the currently presented portion of the media content item.

Once the electronic device detects a user action and determines that is does not involve selection of a particular part of the currently presented section of the media content item, the electronic device analyses the user action to determine whether it is associated with a particular portion of the currently presented media item.

In some implementations the electronic device transmits the detected user action to the server system for analysis. The server system then determines whether the user action is associated with a particular portion of the currently presented media content item. For example, the electronic device determines a gaze point for the user based on the user's eye positions and then transmits that gaze point to the server system. If the user is looking at a specific portion of the electronic display, the server system then determines that the user action (e.g., gaze point) is associated with a particular portion of the content media item (e.g., a particular section of text in a magazine or a portion of a screen during a movie).

Once the electronic device determines that the user action is associated with a particular portion of the currently presented media content item, the electronic device then identifies additional content associated with the particular portion of the currently presented media content item. In some implementations the creator of the content has pre-designated specific additional content for specific sections of the content media item. For example, an author includes additional resources or further reading suggestions for particular sections of an e-book. In other examples, a displayed advertisement has additional content associated with it that includes further information about an advertised product or a link to buy the product.

In other implementations there is no pre-designated additional content for a particular section of the currently presented media content item. In this case, the electronic device or the server system analyzes the content in the section of the media content item that is associated with the user action to determine one or more topics associated with the content. For example, the server system parses the text of an e-book to determine one or more associated topics based on the specific words included in the text. In other examples, the server system uses an image recognition algorithm to identify a particular image of interest in a section of an image or video. Once the image is identified, the server system uses a look-up table or other method to identify topics associated with the identified image. For example, if the server system determines that a particular image or section of an image is a wine glass, the identified topics include wine, home furnishings, and glasses. In other implementations the video or image has associated metadata that identifies topics associated with an image or section of a video.

In some implementations the electronic device then uses the identified topics to select additional content to present to the user. Additional content includes, but is not limited to, advertisements, additional related content (e.g., making of documentaries, commentary, behind the scenes photos), supplemental content, additional learning resources, offers to sell, auction listings, and so forth. For example, if the determined topics are "wine," "glasses," and "home furnishings," then the additional content includes one or more advertisements for wines, information on local wineries, and an advertisement for a current home furnishing auction listing.

The electronic device then selects one or more of additional content items and transmits it to the electronic device for presentation alongside the currently presented media content item. In some implementations the additional content is presented concurrently with the currently presented media content item.

In some implementations the above implementations can be performed remotely by a server system (e.g., streams media data items and receives user action data from the electronic device over a network). Indeed, the various steps described above can be split between a server system and an electronic device in any configuration that is useful.

In some implementations the amount of potential additional media content is too great to store on a single electronic device. Instead, the electronic device is able to access a third party web service (e.g., a server system available over a network that provides a service). The electronic device first determines one or more topics (or keywords) that are associated with the user action. Then, the electronic device transmits the determined topics (or keywords) to the third party service provider. In some implementations the topics are first translated into a search query and then transferred to the third party server system.

The third party server system receives the topics from the electronic device. In some implementations the third party server receives additional metadata about the request. For example, the request includes a number of additional content media items needed, the type of media, the length of the media (in the case of video or audio), the size of the media (for text or images), the source of the media, and any other relevant metadata.

The third party server system then uses the received topics, keywords, or search query to identify relevant media content items. In some implementations the third party server system then ranks the identified media content items based on relevance and any associated metadata and sends back the requested number of additional media content items to the electronic device. In other implementations the server system filters out any media that does not match the received metadata and sends all identified media content items (or links to all identified media content items) and the electronic device ranks them and selects the best matches. In some implementations the third party server system clips text or video to an acceptable length before transmitting them to the client system.

FIG. 1 is a network diagram depicting a client-server system 100, within which one example implementation may be deployed. A networked system 102, in the example forms of a network-based marketplace or publication system, provides server-side functionality, via a network 104 (e.g., the Internet or a wide area network (WAN)), to one or more clients. FIG. 1 illustrates, for example, a web client 106 (e.g., a browser, such as the Internet Explorer® browser developed by Microsoft® Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more content selection applications 120 and user action analysis applications 122. The application servers 118 are, in turn, shown to be coupled to one or more database servers that facilitate access to one or more databases 126.

The user action analysis applications 122 receive one or more user actions from one or more client devices 110. The user action analysis applications 122 then analyze the received user action to determine whether it pertains to specific portions of a media content item. If so, the user action analysis applications determine which one or more specific portions of the media content item relate to the user action. The user action analysis applications 122 then transmit the determined one or more specific portions to the content selection applications 120.

The content selection applications 120 use the received one or more specific portions to select additional content to be provided to a client device 110 based on analysis performed by the user action analysis applications 122. While the content selection and user action analysis 120 and 122 are shown in FIG. 1 to both form part of the networked system 102, it will be appreciated that other configurations can be used such that the content selection applications 120 and the user action selection applications 122 may each form part of a service that is separate and distinct from the networked system 102.

Further, while the system 100 shown in FIG. 1 employs a client-server architecture, the implementations are, of course, not limited to such an architecture, and could equally well find application in a distributed, or peer-to-peer, architecture system, for example. The various content selection and user action analysis applications 120 and 122 could also be implemented as standalone software programs, which do not necessarily have networking capabilities.

The web client 106 accesses the various content selection and user action analysis applications 120 and 122 via the web interface supported by the web server 116. Similarly, the programmatic client 108 accesses the various services and functions provided by content selection and user action analysis applications 120 and 122 via the programmatic interface provided by the API server 114. The programmatic client 108 may, for example, be a seller application (e.g., the Turbo Lister application developed by eBay Inc., of San Jose, Calif.) to enable sellers to author and manage listings on the networked system 102 in an offline manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

Figure 2:
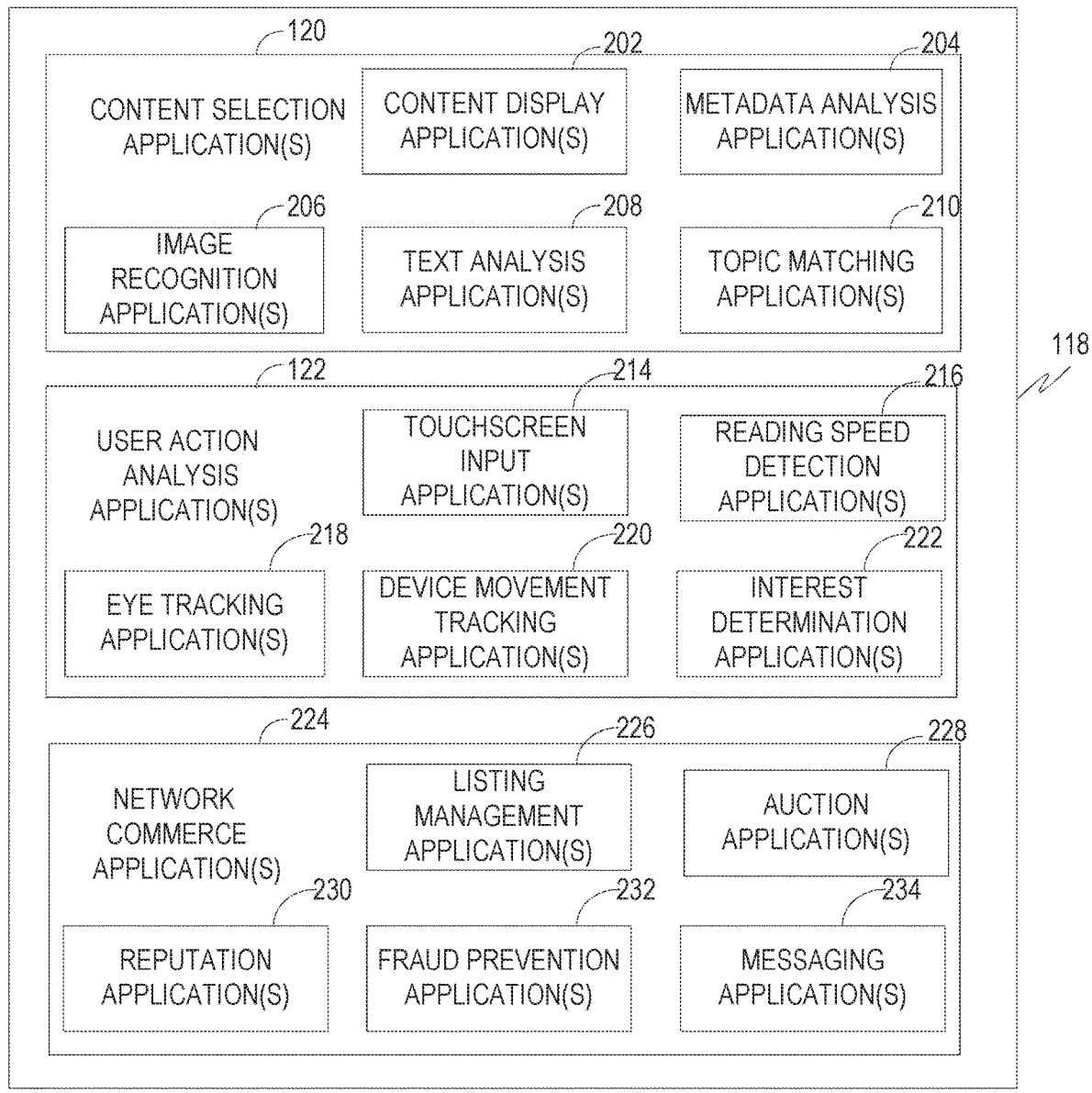
FIG. 2 is a block diagram illustrating content selection and user action analysis applications, in one example implementation.

FIG. 2 is a block diagram illustrating content selection and user action analysis applications 120 and 122 that, in one example implementation, are provided as part of application server(s) 118 in the networked system 102. The networked system 102 provides services that select and transmit for presentation additional content related to media content already being presented at the electronic device of a user. To this end, the content selection application(s) 120, in some implementations, includes several modules or sub-applications to perform its role. As discussed above, a content selection application 120 uses one or more topics of interest to select one or more additional content items. In some implementations the one or more topics of interest are based on a specific piece of currently displayed content (e.g., the text of a document currently displayed to a user). In other implementations the content selection application 120 also uses information about the user, such as age, gender, location, interests, past purchasing activity, and past browsing/media consumption activity, to customize and personalize the selected additional content. In some implementations this user information is submitted directly from the user. In other implementations the information is gathered or inferred by the networked server system (e.g., the networked server system 102 in FIG. 1) and stored in a user profile. In some implementations the server system has a privacy policy that prevents it from gathering or storing any personal information for a user without the user's express permission.

In some implementations the content selection application(s) 120 includes a content display application 202. The content display application 202 transmits media content items for display at the client system. In some implementations the network system stores a plurality of media content items and transmits them to clients for presentation as requested. For example, the networked system hosts a plurality of e-books and transmits or streams to the users based on the user's requests.

Metadata analysis applications 204 support the content selection applications 200 by analyzing content and determining matching topics based on metadata associated with the media content. For example, a movie has associated metadata (e.g., genre information, actor information, director information, length, country of origin, a plot synopsis, etc.). The metadata analysis applications 204 use this information to identify one or more topics associated with the content item.

In some implementations image recognition applications 206 support the content selection applications 120 by analyzing images or a section of an image to identify objects within the images. Any suitable image detection algorithm can be used to accomplish this task. In some implementations, once the image recognition applications 206 identify one or more objects within the image, it uses a lookup table or other suitable mechanism to identify topics associated with the identified object or objects. For example, if the identified object is a classic car, the identified topics include "Car Shows," "Classic Cars," and "Car Maintenance and Repairs."

Text analysis applications 208 support the content selection applications 200 by analyzing text content associated with a particular portion of a text based media content item. The text analysis application 208 parses the relevant text and, using appropriate text parsing algorithms, identifies one or more topics associated with the text content. This identification may be accomplished by identifying word frequencies, key words, and patterns within the text. The identified topics are then sent to the content selection applications 120 to a topic matching application 210 to assist in selecting additional content. For example, if a given portion of text included the text "20-16," "Jerry Rice," and "Jan. 22, 1989," the text analysis application 208 would determine that the portion of text was discussing the 1989 SuperBowl and identify "Professional American Football," "San Francisco 49ers," and "the 80s" as topics of interest.

The topic matching application 210 supports the content selection applications 120 by receiving one or more identified topics of interest from another module or application and using it to identify additional content items that have similar associated topics. For example, if the determined topics are "world history," "books," and "best-sellers," the topic matching applications matches those topics with the book "Guns, Germs, and Steel," which also includes those topics. The topic matching applications 210 then notify the content selection applications 120 of the matching additional content.

In some implementations the user action detection applications 122 receive a notification from a client device (e.g., client device 102 in FIG. 1) that a user action has occurred. The user action detection application 122 then determines whether the user action is associated with a specific section of the currently presented media content. In accordance with a determination that the user action is associated with a specific portion of the media content item, the user action detection application then determines the specific portion of the media content item that is associated with the user action.

A touchscreen input application 214 receives and interprets touch screen input from a client device. For example, if the user makes a swipe gesture on the touch screen of a device currently displaying an electronic book, the touch screen input application 214 determines what specific portion of the electronic book is associated with the swiping motion (e.g., the page that is displayed after the swipe is complete).

The reading speed detection application 216 calculates the approximate reading speed of a user. The reading speed can be calculated by determining the number of words on a page and how long it takes the user to turn to the next page. As more and more pages are read, the reading speed of the user is approximated more accurately. Then, when the user turns to a new page in an electronic document, the user action analysis application 212 can estimate the user's current reading position on the page by estimating the number of words the user has read since the page was turned. For example, if the reading speed detection application 216 determines that the user averages about 120 words read per minute and the user has been reading a page with about 500 words for two minutes, the reading speed detection application can then estimate that the reader is about half way through the text (e.g., about 250 words down the page). The user action analysis application 212 can then identify the nearby text as the specific portion of media content currently of interest to the user.

The eye tracking application 218 uses a camera or infrared tracking device to measure the movement of a user's eyes. With this information, and information regarding the position of a display associated with the user of the client device, the eye tracking application 218 can estimate the particular portion of a display that the user is current focusing on. The eye tracking application 218 then identifies this currently viewed portion of the display as the portion of the media content item currently of interest to the user.

In some implementations device movement tracking applications 220 determine whether the client device is moving and in what direction. This can be tracked by way of a GPS tracking device or an accelerometer device internal to the client device. When the movement of the device changes (e.g., starts moving, ceases moving, or changes movement speeds), the device movement tracking application 220 records a user action. In some implementations the device movement tracking application 220 determines that the change in movement is the result of user interest in the presented media content (e.g., the user stops walking to focus on a particular scene). In this case, the device movement tracking applications 220 identify the currently displayed portion of the media content item as of interest to the user.

Interest determination applications 222 use the received user actions to determine whether the user action is indicative of user interest in a particular portion of the presented media content. For example, the client device reports a constant rate of movement for 25 minutes and then a deceleration to a stop. Based on the accompanying GPS data, the interest determination application 222 determines that the detected action is a result of a train ride that the user is on coming to an end, not increased user interest in the current content. Conversely, if the user inputs instructions to zoom in on a particular section of an image, the interest determination application 222 determines that the user is interested in the zoomed in portion of the image.

In another example, a user increases the volume of current presented audio or video content. The interest determination application 222 determines whether there has been a corresponding increase in environmental noise using a microphone or other audio sensing device. If there has been an increase in environmental noise, the interest determination application 222 determines that the increase in volume level is the result of the user reacting to the increased background noise, not a result of increased interest in the currently present content. However, if the interest determination application 222 determines there has been no recent increase in background noise, then the user increasing the volume may be a result of increased user interest in the currently presented content.

In some implementations the networked system 102 includes one or more network commerce applications 224 for enabling commercial transactions over the networked system 102.

Listing management applications 226 allow sellers to create and manage listings. Specifically, where a particular seller has authored and/or published a large number of listings, the management of such listings may present a challenge. The listing management applications 226 provide a number of features (e.g., auto-relisting, inventory level monitors, etc.) to assist the seller in managing such listings.\

One or more post-listing management applications may also assist sellers with a number of activities that typically occur post-listing. For example, upon completion of an auction facilitated by one or more auction applications 228, a seller may wish to leave feedback regarding a particular buyer. To this end, a post-listing management application may provide an interface to one or more reputation applications 230, so as to allow the seller to conveniently provide feedback regarding multiple buyers to reputation applications 230.

Reputation applications 230 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 230 allow a user (for example, through feedback provided by other transaction partners) to establish a reputation within the networked system 102 over time. Other potential trading partners may then reference such a reputation for the purposes of assessing credibility and trustworthiness.

A number of fraud prevention applications 232 implement fraud detection and prevention mechanisms to reduce the occurrence of fraud within the networked system 102.

Messaging applications 234 are responsible for the generation and delivery of messages to users of the networked system 102 (such as, for example, messages advising users regarding the status of listings at the networked system 102 (e.g., providing "outbid" notices to bidders during an auction process or providing promotional and merchandising information to users)). Respective messaging applications 234 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, Wi-Fi, WiMAX) networks 104.

It is important to note that although FIG. 2 shows content selection applications 120, user action analysis applications 122, and network commerce applications, some implementations do not include all these application. For example, an e-book reader can include both the content selection applications 120 and the user action analysis applications 122 but not include any network commerce applications.

FIG. 3 illustrates an exemplary user interface 302 of a client device 300 presenting an electronic document (e-book). The electronic device 300 includes a display 302. In the display is digital text 306 (in this case an article about polar bears). The user interface also displays a user interaction object 304 that represents user input at a particular part of the display from either a mouse input or a finger gesture on a particular section of a touch screen. In this case the user input initiates changing from a first page (e.g., page 1) to a second page (e.g., page 2).

Figure 4:
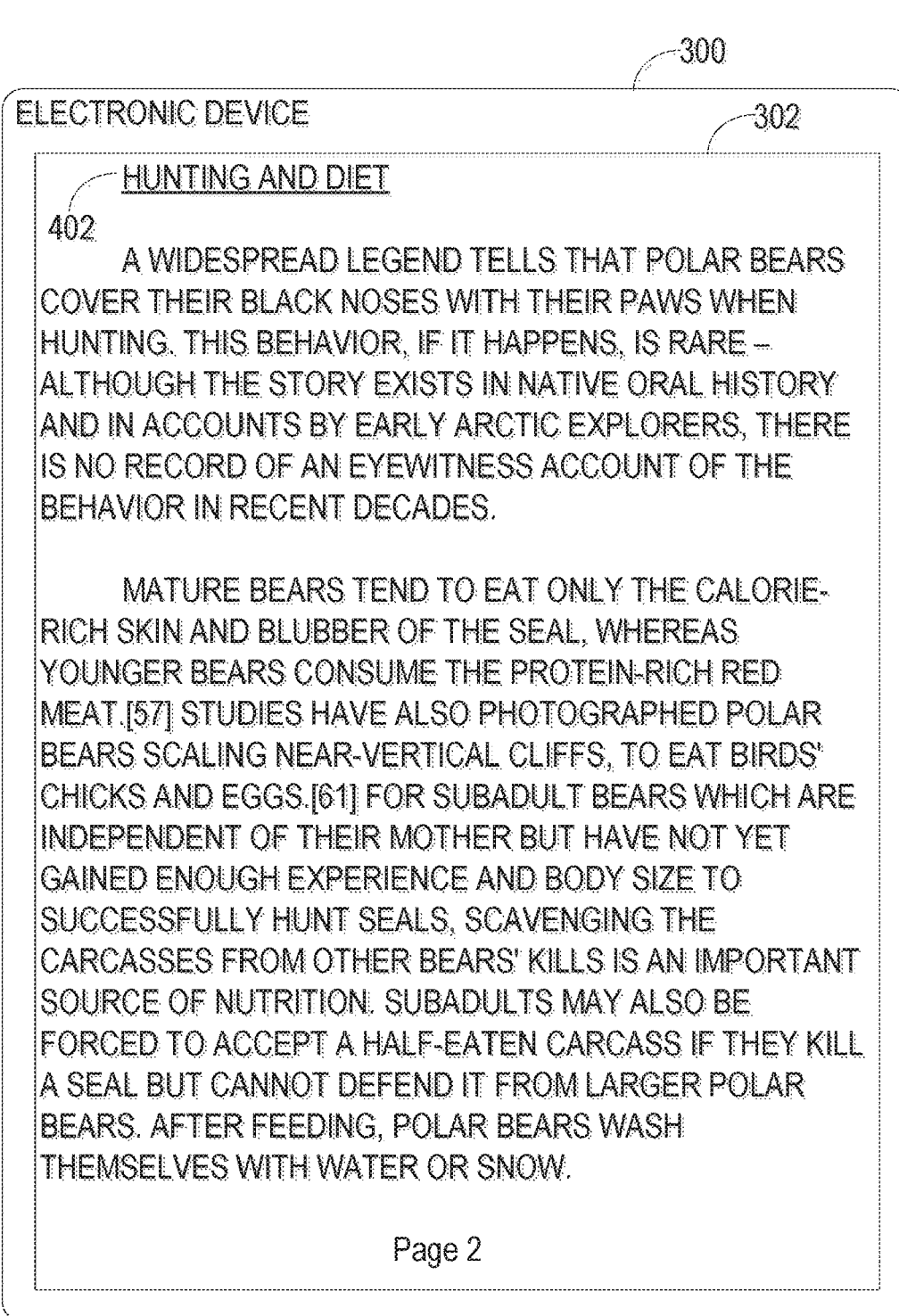
FIG. 4 illustrates an exemplary user interface of a client device presenting an electronic document (e-book).

FIG. 4 illustrates an exemplary user interface 400 of a client device 300 presenting an electronic document (e-book). The electronic device 300 includes a display 302. In the display is page 2 of the digital text 402 (in this case an article about polar bears) shown in FIG. 3 after the page turning input received previously.

FIG. 5 illustrates an exemplary user interface 500 of a client device 300 presenting an electronic document (e-book). The electronic device 300 includes a display 302. In the display is page 2 of the digital text 402 (in this case an article about Polar bears) as shown in FIG. 4 and additional content 502 displayed concurrently with the original content. In this case the additional content takes the form of a link to additional information about early arctic explorers 502. In some implementations the additional content is displayed immediately. In other implementations the additional content is displayed after a fixed amount of time (e.g., 5 seconds after the page turns). In yet other implementations, the additional content is displayed based upon the user's reading speed (e.g., displayed when the device estimates the user has just read the related content.)

Figure 6A:
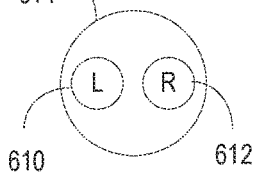
FIG. 6A illustrates an exemplary user interface of a display presenting an electronic document (e-magazine).

FIG. 6A illustrates an exemplary user interface 600 of a display presenting an electronic document (e-magazine). The display includes a section containing article content 602 and three sections containing advertisements (World Wide Airways Advertisement 604, Cunningham Automobile Corporation Advertisement 606, and Rondo Soda Advertisement 608). The display has an associated camera that tracks the eye movements of the user. In this case the left eye is pointed to a left eye focus point 610 on the display, and the right eye is pointed to a right eye focus point 612 on the display. Based on the two focus points, the device calculates a gaze area 614 in the area assigned to the Cunningham Automobile Corporation advertisement 606. The network system can use this information to determine that user is currently focused on the Cunningham Automobile Corporation advertisement 606.

Figure 6B:
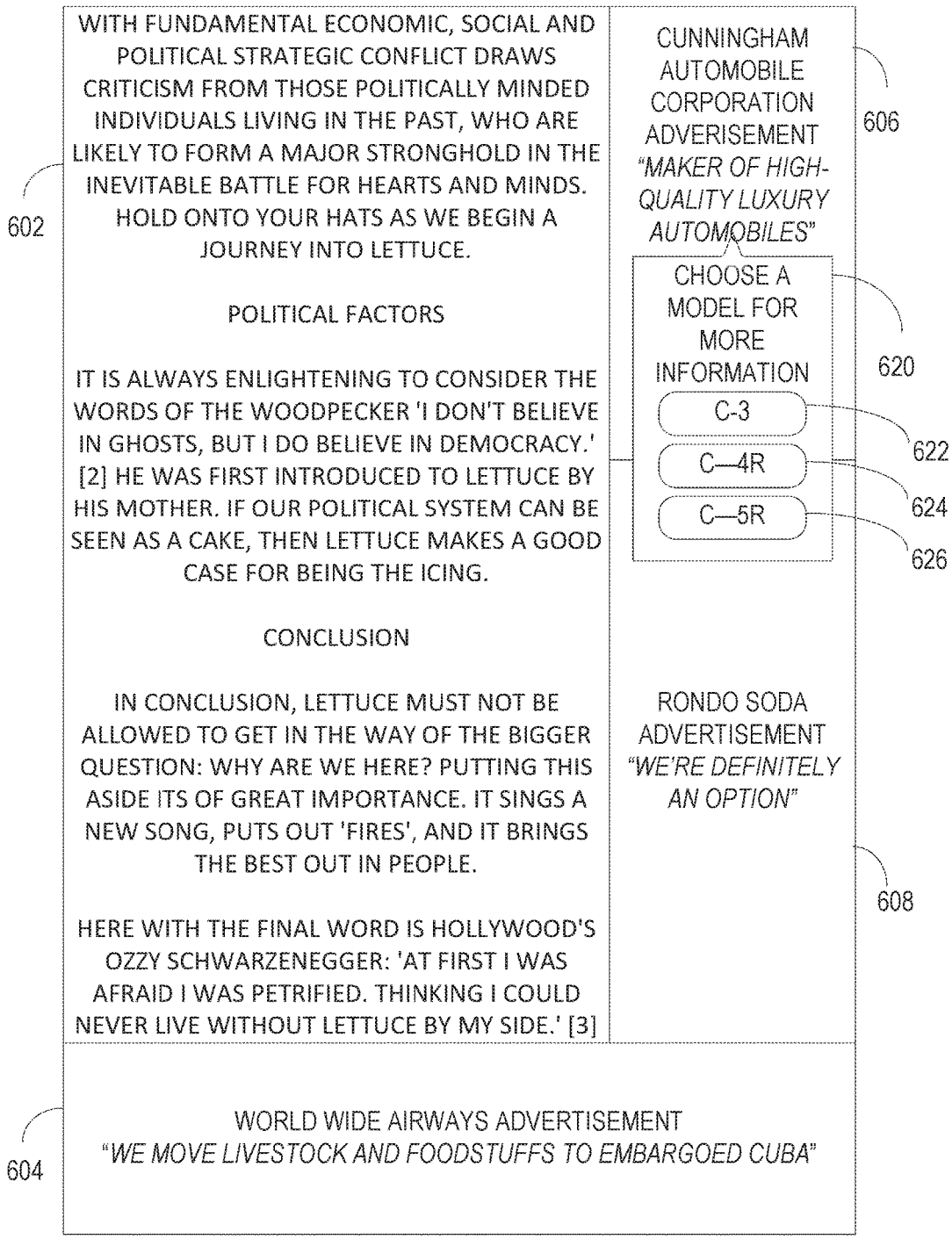
FIG. 6B illustrates an exemplary user interface of a display presenting an electronic document (e-magazine).

FIG. 6B illustrates an exemplary user interface 600 of a display presenting an electronic document (e-magazine). The display includes article content 602, 3 advertisements (604, 606, and 608), and additional content 620 that was displayed in response to the electronic device associated with the display determining that the user is interested in further content related to the Cunningham Automobile Corporation Advertisement 606 based on the detected position of the user's eyes. The additional content 620 is displayed partially overlapping and simultaneous with the already displayed content. The additional content 620 includes information related to the Cunningham Automobile Corporation advertisement 606, including three buttons (622, 624, 626) that offer additional information about specific automobiles sold by the company associated with the Cunningham Automobile Corporation advertisement 606 (presumably the Cunningham Automobile Corporation).

FIGS. 7-14 are flow diagrams that represent a method for surfacing related content based on user interactions with the currently presented content. It should be noted that while each Figure is described as being performed by either an electronic device or by a server system communicating with that electronic device, the steps in each of the Figures may be performed either by the electronic device or by a server system communicating with that device. As such, the methods described below can be rearranged so that all the steps are performed at a single electronic device, all the steps are performed at a server system in communication with that device, or the steps are divided up between the two devices (server device and a client device) pieces in any way.

Figure 7:
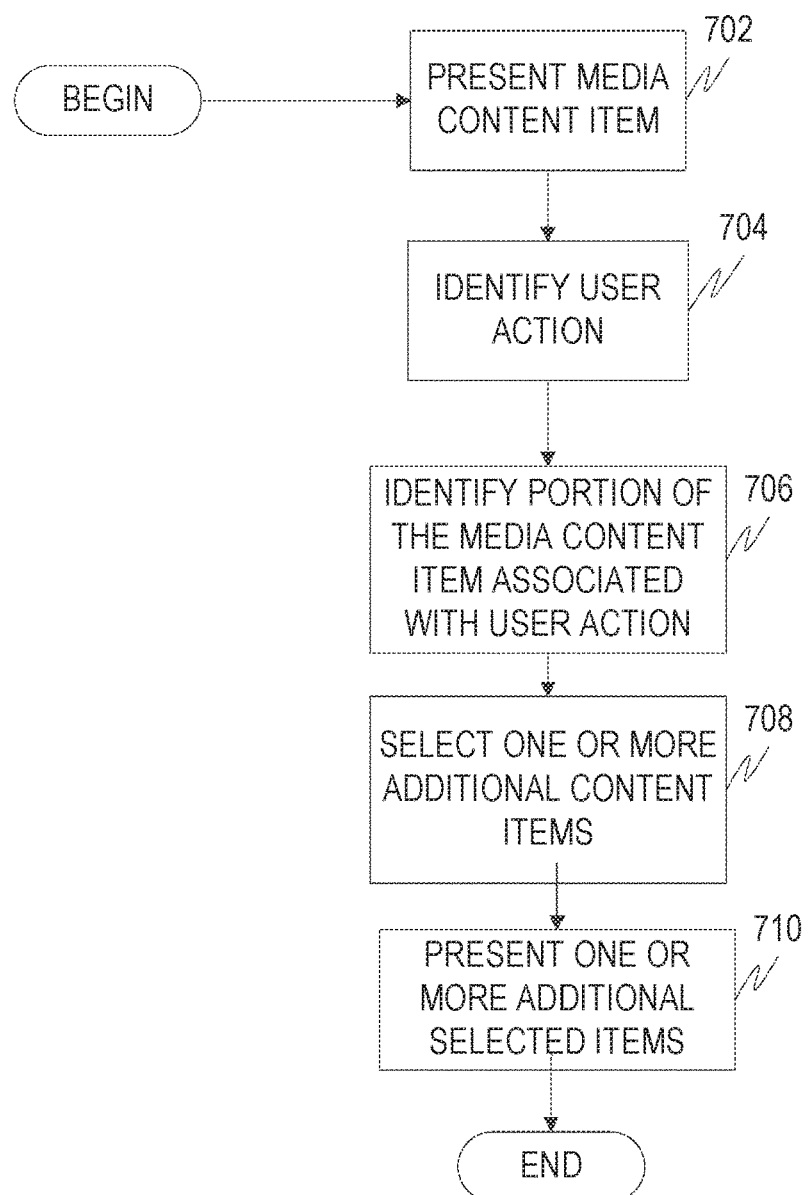
FIG. 7 is a flow diagram illustrating a process for surfacing related content based on user interactions with the currently presented content in accordance with some implementations.

FIG. 7 is a flow diagram illustrating a process for surfacing related content based on user interactions with the currently presented content in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the electronic device (e.g., electronic device 110 in FIG. 1).

In some implementations the method is performed at a computer system including one or more processors and memory storing one or more programs for execution by the one or more processors. The electronic device (e.g., electronic device 110 in FIG. 1) presents (702) a media content item. The media content item is either displayed on a screen (in the case of a visual media content item such as a movie, webpage, e-book, etc.) or played over a speaker or headphones (in the case of an audio media content item such as music, podcasts, audiobooks, etc.).

The electronic device (e.g., electronic device 110 in FIG. 1) then identifies a user action 704. An identified user action can include any user action that the electronic device (e.g., electronic device 110 in FIG. 1) is capable of detecting including, but not limited to, input received from the user from a keyboard, mouse, microphone, touchscreen, camera, or any other input device; a physical movement of the user; position of the user's body, including his or her eyes; control commands from the user (e.g., pausing, zooming in, turning up the volume); and sounds made by the user (detecting and analyzing user speech). Some user actions include specifically selecting a part of the media content item currently on the display. For example, clicking with a mouse, touching an icon with a figure gesture, hovering a pointer, and similar user actions all involve selecting a particular part of the content currently displayed. Other user actions do not involve selecting a particular part of the content that is currently displayed but may still be associated with a particular part. For example, a swipe gesture on an e-reader will result in all of the currently displayed content being removed and a new section of the media content item (in this case an e-book) being displayed. The finger swipe does not select any portion of the previous page or the new page, but is associated with both.

Thus the electronic device (e.g., electronic device 110 in FIG. 1) analyses the user action to identify (706) a portion of the media content item associated with the user action. For example, if the user action is a mouse click on a displayed link, the electronic device (e.g., electronic device 110 in FIG. 1) identifies the link (and the content it links to) as being associated with the user action. If the user action is an eye movement to change from one gaze point to a second gaze point, the electronic device (e.g., electronic device 110 in FIG. 1) identifies the content displayed in the part of the screen that the user is currently focused on as being associated with the changing gaze point.

In some implementations if the user action involves direct selection of a part of the currently displayed media content item, the electronic device (e.g., electronic device 110 in FIG. 1) does nothing. If the user action is merely associated with a portion of the currently presented media content item, the electronic device (e.g., electronic device 110 in FIG. 1) selects (708) one or more additional content items. These additional content items are selected based on the identified content. For example, if the identified content is a picture of a whale, the additional content may be an article about whales.

The electronic device (e.g., electronic device 110 in FIG. 1) then presents (710) the one or more additional selected content items at the electronic device. In some implementations the additional content is displayed simultaneously with the originally displayed content, either overlapping or partially displacing some of the content.

Figure 8:
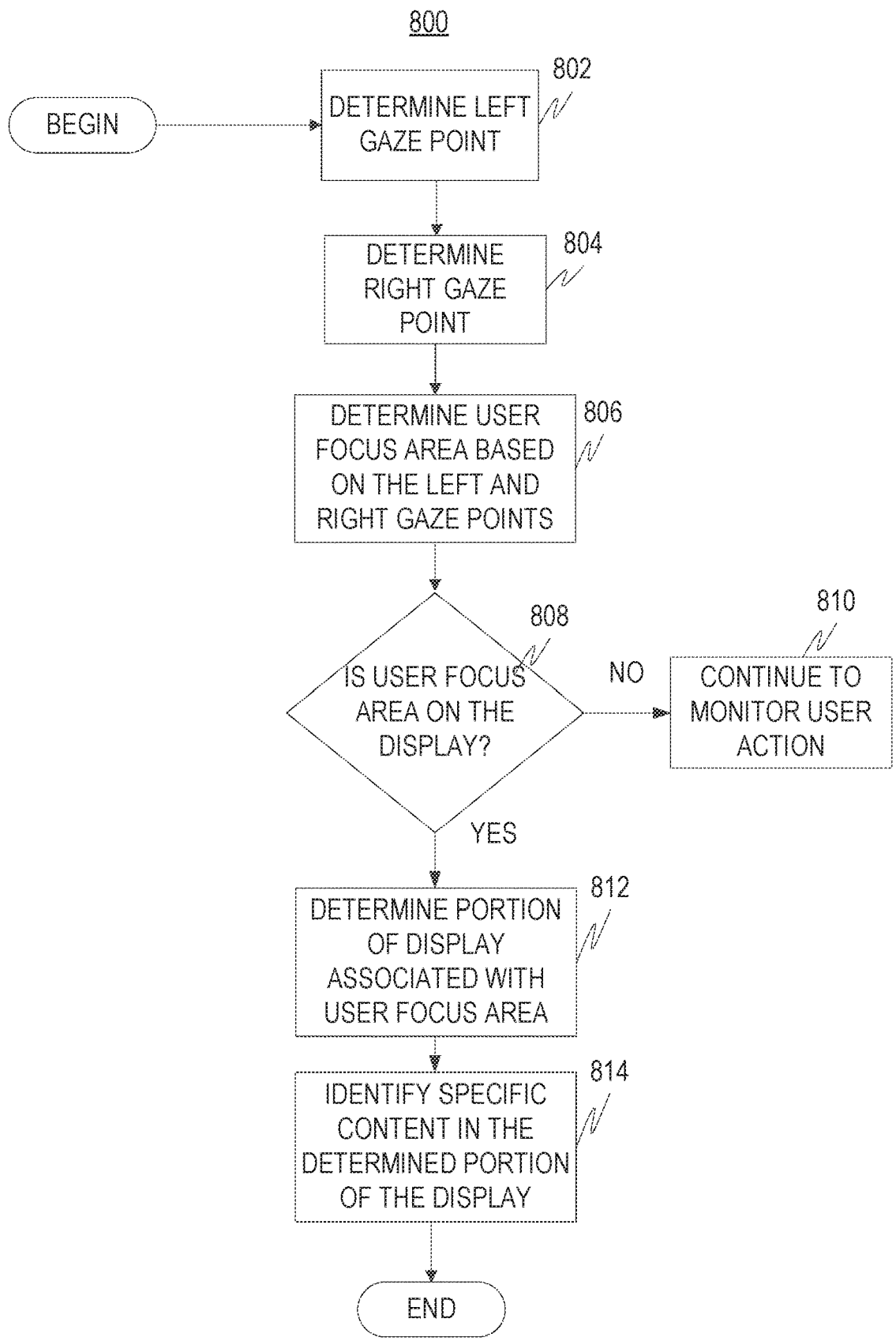
FIG. 8 is a flow diagram illustrating a process for identifying content viewed by the user by eye-tracking in accordance with some implementations.

FIG. 8 is a flow diagram illustrating a process for identifying content viewed by the user by eye-tracking in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the networked server system (e.g., the networked server system in FIG. 1).

In some implementations the method is performed at a computer system including one or more processors and memory storing one or more programs for execution by the one or more processors. The electronic device (e.g., electronic device 110 in FIG. 1) uses eye tracking technology to determine what content the user is currently focused on. First, the electronic device (e.g., electronic device 110 in FIG. 1) has a camera or other means of determining eye position.

The electronic device (e.g., electronic device 110 in FIG. 1) then determines (802) the left gaze point. Determining a gaze point includes using the position of an eye to determine a line of sight for that eye. Then the device determines at what point that line of sight intercepts a particular surface (in this case a display). The point where the line of sight crosses through the display is a gaze point. Each eye has its own specific gaze point.

The electronic device (e.g., electronic device 110 in FIG. 1) then determines (804) the right gaze point. Using the right and left gaze points, the electronic device (e.g., electronic device 110 in FIG. 1) determines (806) the user focus area. The user focus area is where the user is current focusing. This is determined by measuring the distance between the two gaze points. Gaze points that are relatively far apart indicate that the user focusing on something behind the display or just gazing off into space. Gaze points that are too close together or where the right gaze point is to the left of the left gaze point indicate that the user is focusing on something in front of the display. Thus, by determining the focus area, the electronic device (e.g., electronic device 110 in FIG. 1) determines (808) whether the user has a focus area that is currently on the display. If not, the electronic device (e.g., electronic device 110 in FIG. 1) continues to monitor user actions (810).

When the electronic device (e.g., electronic device 110 in FIG. 1) determines that the user focus area is on the display screen, the electronic device (e.g., electronic device 110 in FIG. 1) then determines (812) the portion of the display associated with the user focus area. For example, the electronic device (e.g., electronic device 110 in FIG. 1) determines whether the focus area is at the top of the screen, the bottom of the screen, or the left or right side of the screen. Depending on the precision of the camera that detects eye position, the electronic device (e.g., electronic device 110 in FIG. 1) can narrow down the user focus area to a very specific portion of the screen (e.g., see 614 of FIG. 6A).

The electronic device (e.g., electronic device 110 in FIG. 1) then identifies (814) the particular content displayed at the part of the display that the user is current focusing on. For example, if the user focus area is above text, the electronic device (e.g., electronic device 110 in FIG. 1) determines the content of that text. If the user focus area is on an image or video, the electronic device (e.g., electronic device 110 in FIG. 1) analyzes the image or video to determine what is being displayed.

Figure 9:
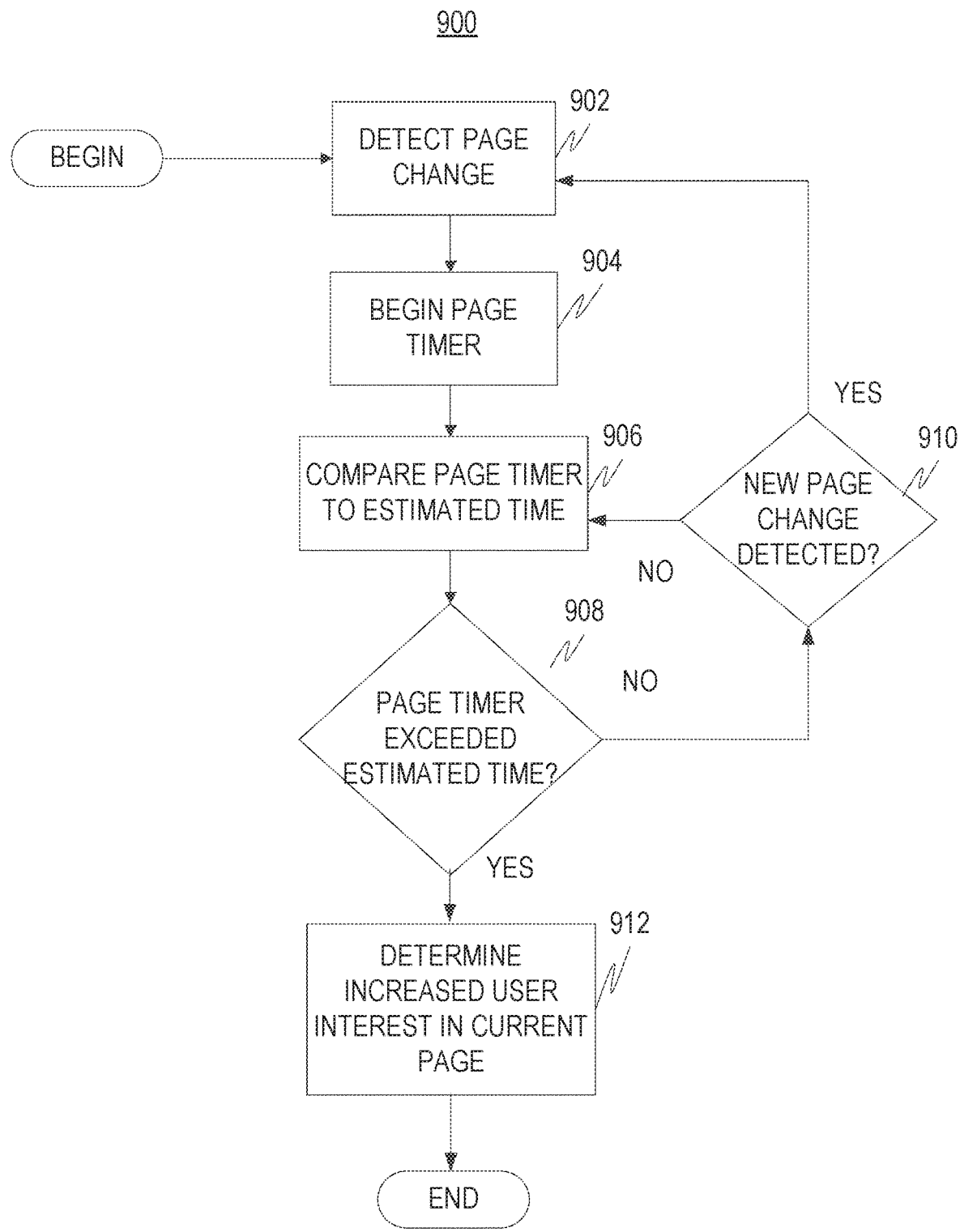
FIG. 9 is a flow diagram illustrating a process for determining user interest in a current page of content in accordance with some implementations.

FIG. 9 is a flow diagram illustrating a process for determining user interest in a current page of content in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the electronic device (e.g., electronic device 110 in FIG. 1).

In some implementations the method is performed at a computer system including one or more processors and memory storing one or more programs for execution by the one or more processors. In some implementations the electronic device (e.g., electronic device 110 in FIG. 1) is an e-reader or other device capable of displaying textual media content. For example, an e-reader can display e-books. The electronic device (e.g., electronic device 110 in FIG. 1) can estimate a user's interest on a particular page by measuring the amount of time a user spends on that page relative to the amount of time the electronic device (e.g., electronic device 110 in FIG. 1) predicts the user will spend on the page.

The electronic device (e.g., electronic device 110 in FIG. 1) first detects (902) a page change. A page change occurs whenever the user replaces previous content on the display with new content. For example, a user swipes on a touch screen that is currently displaying an e-book. The next page of the e-book is displayed in response. Once the next page is displayed, the electronic device (e.g., electronic device 110 in FIG. 1) begins (904) a page timer. A page timer tracks the amount of time that the user has been on a specific page. In some implementations page timers are used to build a reading speed estimate for a user. For example, by keeping track of the amount of time spent on each page for the last 50 pages and the number of words on each page, the electronic device (e.g., electronic device 110 in FIG. 1) can generate an average reading speed. (for example, 2500 words/30 minutes=83.3 words per minutes).

Using an estimate average reading speed, the electronic device (e.g., electronic device 110 in FIG. 1) can then generate an estimate reading time for the new page. For example, if the reading speed is 83.3 words per minute and the new page has 250 words, the electronic device (e.g., electronic device 110 in FIG. 1) can estimate that the user will take about 3 minutes to finish the page. The electronic device (e.g., electronic device 110 in FIG. 1) can then use this value as the estimated time for the user to finish the page. In some implementations the electronic device (e.g., electronic device 110 in FIG. 1) also adds a buffer amount to the estimate time (e.g., 20% of the estimated time) to account for minor variations in reading speed due to difficulty of content and various distractions that are unrelated to the content.

The electronic device (e.g., electronic device 110 in FIG. 1) then compares (906) the current page timer to the estimated time to determine if the page time exceeds (908) the estimated time. If not, the electronic device (e.g., electronic device 110 in FIG. 1) determines (910) whether a new page change command has been received. If so, it begins the process again. If not, it continues to compare (906) the page time to the estimated time.

If the page time has exceeded the estimated time, the electronic device (e.g., electronic device 110 in FIG. 1) determines (912) that the user has increased interested in the current page and its contents.

Figure 10:
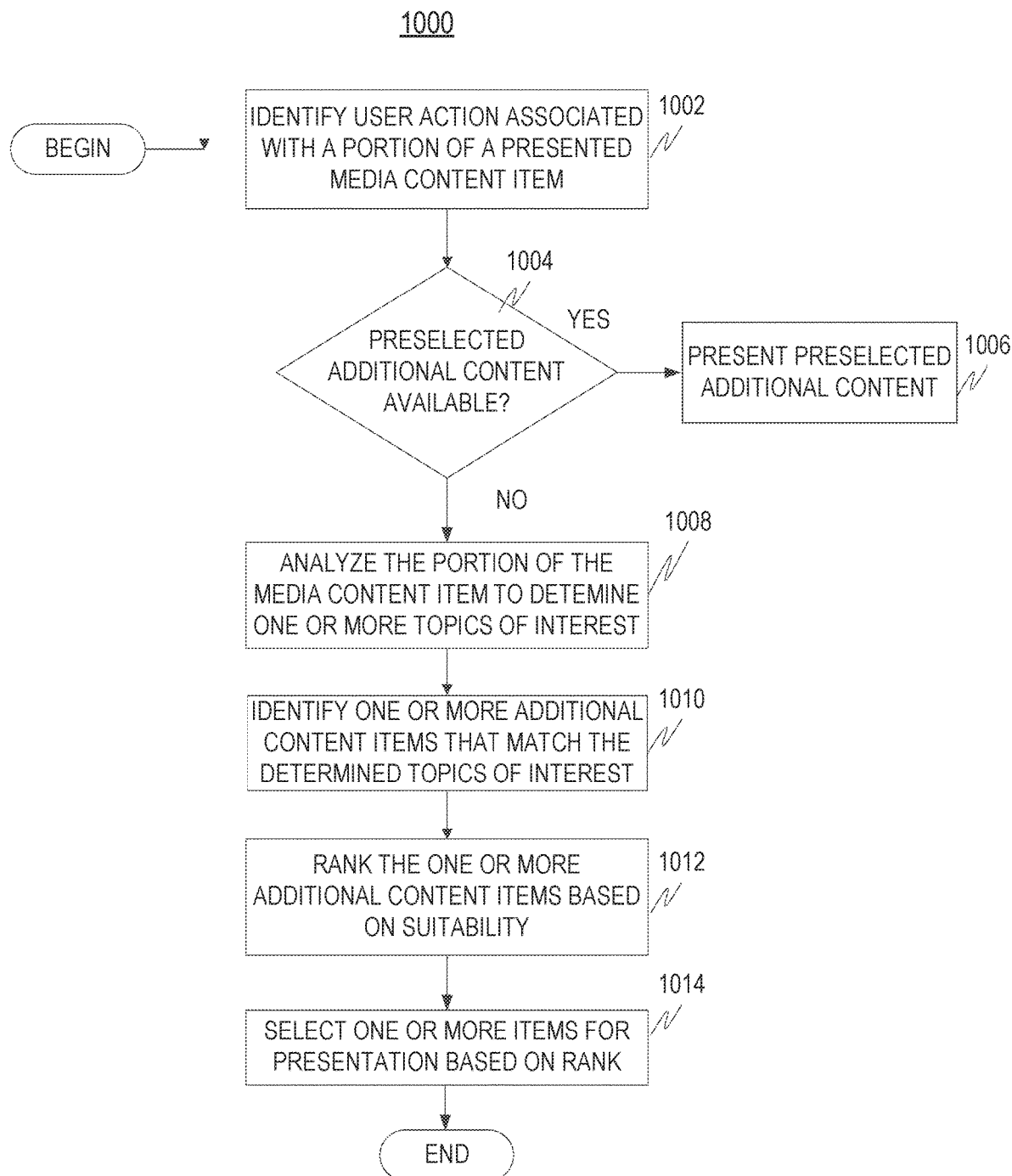
FIG. 10 is a flow diagram illustrating a process for selecting additional content to surface in accordance with some implementations.

FIG. 10 is a flow diagram illustrating a process for selecting additional content to surface in accordance with some implementations. Each of the operations shown in FIG. 10 may correspond to instructions stored in a computer memory or computer readable storage medium. Optional operations are indicated by dashed lines (e.g., boxes with dashed-line borders). In some implementations, the method described in FIG. 10 is performed by the electronic device (e.g., electronic device 110 in FIG. 1).

In some implementations the method is performed at a computer system including one or more processors and memory storing one or more programs for execution by the one or more processors. The electronic device (e.g., electronic device 110 in FIG. 1) first identifies (1002) a user action that is associated with a portion of a presented media content item. As described in detail above, the user action can be anything the user does that the electronic device (e.g., electronic device 110 in FIG. 1) can detect. For example, a user action includes the physical movement of the user (provided the device has a camera, accelerometer, or other means for tracking movement) and interactions the user has with the electronic device (e.g., electronic device 110 in FIG. 1) such as mouse inputs, touch inputs, or any other direct input into the system.

Once the user action is detected and the associated content is identified, the electronic device (e.g., electronic device 110 in FIG. 1) then determines (1004) whether there is already preselected additional content available. In some implementations the preselected additional content is chosen by the author or creator of the content to enhance the user's experience with the content. In other implementations the preselected additional content is a form of advertisement inserted into the media content item as a result of a business transaction between the creator and the advertiser.

In accordance with a determination that preselected additional content is available, the electronic device (e.g., electronic device 110 in FIG. 1) then presents (1006) the preselected additional content. In accordance with a determination that the preselected additional content is not available, the electronic device (e.g., electronic device 110 in FIG. 1) then analyzes (1008) the portion of the media content item identified as associated with the user action to determine one or more topics of interest based on the content of the analyzed portion.

The electronic device (e.g., electronic device 110 in FIG. 1) then uses the topics of interest to identify (1010) one or more additional content items that match the determined topics of interest. For example, if the portion of the media content item is an essay about lettuce, the identified topics of interest include "lettuce," "agriculture," "cooking," and "Spanish Exports." The electronic device (e.g., electronic device 110 in FIG. 1) then matches those topics of interest against the topics associated with potential additional content items. As a result of the matching, the electronic device (e.g., electronic device 110 in FIG. 1) identifies two additional content items, a book called "The History of Lettuce" and a recipe for "Wilted Lettuce Salad."

The electronic device (e.g., electronic device 110 in FIG. 1) then ranks (1012) the one or more additional content items based on suitability for the user. Continuing with the example above, the electronic device (e.g., electronic device 110 in FIG. 1) determines, based on a user profile associated with the user, that the user is interested in cooking but not history. Thus, the electronic device (e.g., electronic device 110 in FIG. 1) ranks the recipe for "Wilted Lettuce Salad" above the book entitled "The History of Lettuce."

The electronic device (e.g., electronic device 110 in FIG. 1) selects (1014) one or more additional content items for presentation based on their respective ranking. In some implementations the electronic device (e.g., electronic device 110 in FIG. 1) determines how many additional content items to display. This determination is based on what media content is currently displayed (e.g., if a video is playing the number of additional content items is very low, perhaps only 1), the space available on the display, and the preferences of the user. Once the number of additional content items to display is determined, the electronic device (e.g., electronic device 110 in FIG. 1) chooses the highest ranked additional content items to fulfil the needed number of additional content items.

Figure 11:
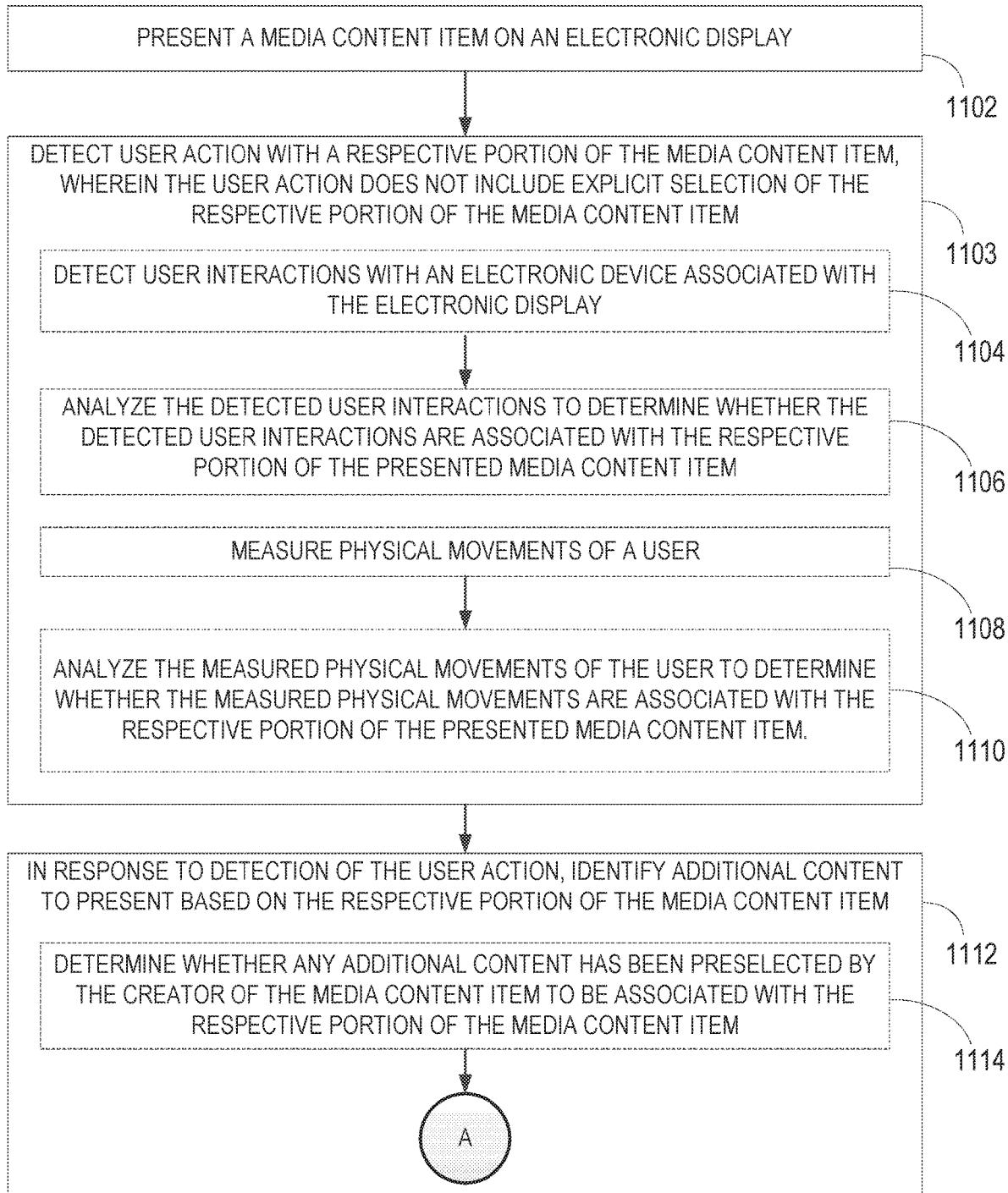
FIG. 11 is a flow diagram illustrating a process for surfacing additional content based on user interaction with currently presented content in accordance with some implementations.

FIG. 11 is a flow diagram illustrating a process for surfacing additional content based on user interaction with currently presented content in accordance with some implementations. Each of the operations shown in FIG. 11 may correspond to instructions stored in a computer memory or computer readable storage medium. Optional operations are indicated by dashed lines (e.g., boxes with dashed-line borders). In some implementations, the method described in FIG. 11 is performed by the electronic device (e.g., electronic device 110 in FIG. 1).

In some implementations the method is performed at a computer system including one or more processors and memory storing one or more programs for execution by the one or more processors. The electronic device (e.g., electronic device 110 in FIG. 1) presents (1102) a media content item on an electronic display. As noted above, media content items include, but are not limited to, textual content (e.g., an e-book, an electronic magazine, a website, etc.), video content (e.g., a movie, TV show, animation, web clip, etc.), audio content (e.g., a music file or a podcast), images, video games, or any other media content. Media content items can be presented on an electronic device, such as a display device for visual media like images, text, or video. Audio media content items, such as music or podcasts, can be presented though speakers, earphones, or the like.

The electronic device (e.g., electronic device 110 in FIG. 1) detects (1103) user action with a respective portion of the media content item, wherein the user action does not include explicit selection of the respective portion of the media content item. For example, a user action that includes a direct click on a link includes explicit selection of the respective portion of the media content item, while a user action that includes turning up the volume does not explicitly select a respective portion of the media content item.

In some implementations detecting user action includes detecting (1104) user interactions with an electronic device associated with the electronic display. For example, any user action that involves the user intentionally using an input device, such as a mouse, keyboard, touch screen, microphone, camera, or other input device to interact with the electronic device (e.g., electronic device 110 in FIG. 1). Once a user action is detected, the electronic device (e.g., electronic device 110 in FIG. 1) analyzes (1106) the detected user interactions to determine whether the detected user interaction are associated with the presented media content item. For example, if the user uses a mouse to hover a cursor over a particular image on a web page, the electronic device (e.g., electronic device 110 in FIG. 1) determines (1106) that the user action (mouse hovering) is associated with the particular image on the web page.

In some implementations the electronic device (e.g., electronic device 110 in FIG. 1) measures (1108) physical movements of a user. For example, the electronic device (e.g., electronic device 110 in FIG. 1) measures the eye movements of a user to track where the user is looking. A user's movements can be considered a user action. The electronic device (e.g., electronic device 110 in FIG. 1) then analyzes (1110) the measured physical movements of the user to determine whether the measured physical movements are associated with the presented media content item.

It should be noted that user actions include but are not limited to changing the currently displayed page, pausing a video at a particular part, rewinding to review or re-listen to a particular section, eye movement, changes in movement of a user, voice commands received by a user, volume changes by a user, and the like.

In some implementations, in response to detection of the user action, the electronic device (e.g., electronic device 110 in FIG. 1) identifies (1112) additional content to present based on the content included in the portion of the respective portion of the media content item. In some implementations identifying additional content includes determining (1114) whether any additional content has been preselected by the creator of the media content item to be associated with the respective portion of the media content item. For example, an book is created by an author. In addition to the text of the book, the author compiles a list of additional media resources, such as additional books, recommendations, clips, scientific papers, web pages, and so forth. The author then chooses which specific section of the e-book each additional media resources is associated with. Then if the user demonstrates interest in a specific portion through a user action, the previously associated additional content item can be displayed.

Figure 12:
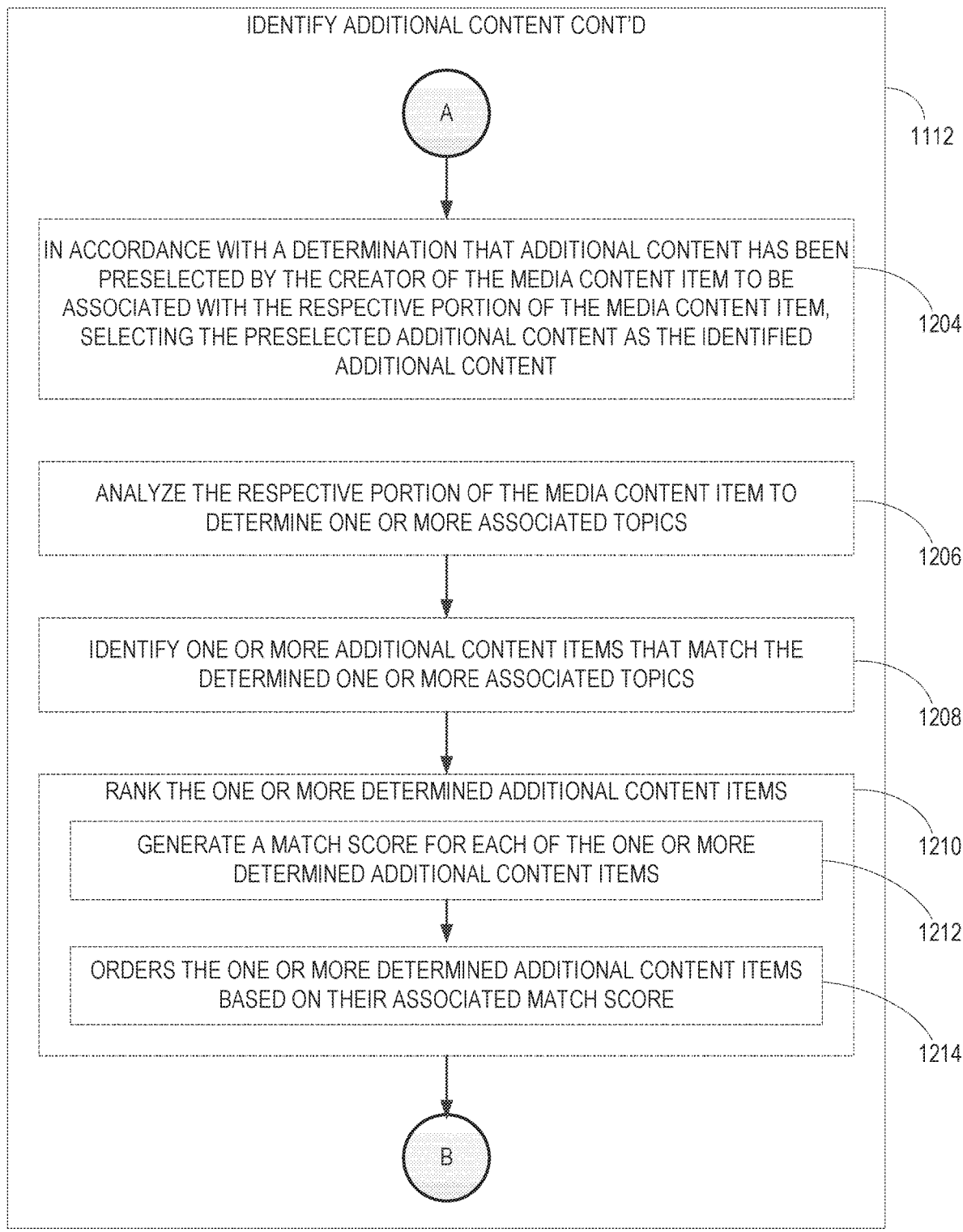
FIG. 12 is a flow diagram illustrating a process for surfacing additional content based on user interaction with currently presented content in accordance with some implementations.

FIG. 12 is a flow diagram illustrating a process for surfacing additional content based on user interaction with currently presented content in accordance with some implementations. Each of the operations shown in FIG. 12 may correspond to instructions stored in a computer memory or computer readable storage medium. Optional operations are indicated by dashed lines (e.g., boxes with dashed-line borders). In some implementations, the method described in FIG. 12 is performed by the electronic device (e.g., electronic device 110 in FIG. 1).

In some implementations the method is performed at a computer system including one or more processors and memory storing one or more programs for execution by the one or more processors. In accordance with a determination that additional content has been preselected by the creator of the media content item to be associated with the respective portion of the media content item (1112), the electronic device (e.g., electronic device 110 in FIG. 1) determines (1204) the preselected additional content as the identified additional content. For example, a particular scene in a movie contains a tablet computer, and the electronic device determines that the user is looking at the tablet. The electronic device (e.g., electronic device 110 in FIG. 1) then determines that the creator of the movie has preselected an advertisement for the tablet and associated it with the scene in the movie where the tablet appears. The electronic device (e.g., electronic device 110 in FIG. 1) then selects the tablet advertisement as the additional content.

In some implementations the electronic device (e.g., electronic device 110 in FIG. 1) analyzes (1206) the respective portion of the media content item to determine one or more associated topics. For example, if the respective portion is text, the electronic device (e.g., electronic device 110 in FIG. 1) parses the text to identify keywords and then identifies specific topic using the keywords. Once the one or more topics have been determined, the electronic device (e.g., electronic device 110 in FIG. 1) identifies the particular portion of the currently presented media content item (1208) one or more additional content items that match the determined one or more associated topics.

In some implementations the electronic device (e.g., electronic device 110 in FIG. 1) then ranks (1210) the one or more determined additional content items. Ranking includes the electronic device (e.g., electronic device 110 in FIG. 1) generating (1212) a match score for each of the one or more determined additional content items. For example, the electronic device (e.g., electronic device 110 in FIG. 1) has a list of topics or keywords that were determined by analyzing a portion of the presented media content item. Similarly each media content item includes a list of associated topics or keywords. Then the electronic device (FIG. 1, 110) generates a match score based on the number of keywords or topics that each additional media content item has in common with the list of associated topics or keywords, such that additional media content items that have more topics or keywords in common have a higher match score. In some implementations each associated topic has an associated relevance score that is used in calculating a match score. In some implementations a match score is based, at least in part, on demographic information of the user. In some implementations a match score is based on user preference data for the user.

In some implementations the electronic device (e.g., electronic device 110 in FIG. 1) orders (1214) the one or more determined additional content items based on their associated match score. For example, the additional content items with the highest match score are listed first.

Figure 13:
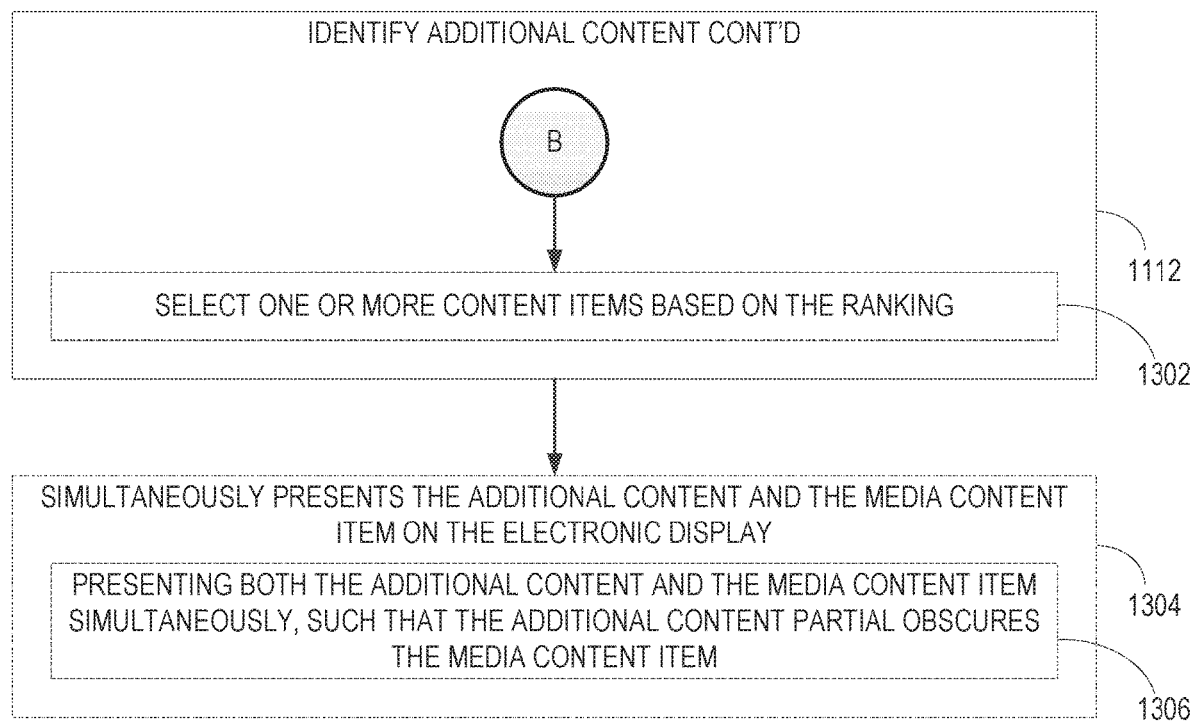
FIG. 13 is a flow diagram illustrating a process for surfacing additional content based on user interaction with currently presented content in accordance with some implementations.

FIG. 13 is a flow diagram illustrating a process for surfacing additional content based on user interaction with currently presented content in accordance with some implementations. Each of the operations shown in FIG. 13 may correspond to instructions stored in a computer memory or computer readable storage medium. Optional operations are indicated by dashed lines (e.g., boxes with dashed-line borders). In some implementations, the method described in FIG. 13 is performed by the electronic device (e.g., electronic device 110 in FIG. 1).

In some implementations the method is performed at an electronic device including one or more processors and memory storing one or more programs for execution by the one or more processors. The electronic device (e.g., electronic device 110 in FIG. 1) selects (1302) one or more additional content items based on the rankings of the additional content items. For example, the electronic device (e.g., electronic device 110 in FIG. 1) selects the highest ranked additional content item. In another example, the electronic device (e.g., electronic device 110 in FIG. 1) determines a specific number of needed additional content items and then selects that number of additional content items.

In some implementations the electronic device (e.g., electronic device 110 in FIG. 1) simultaneously present(s) the additional content and the media content item on the electronic display. This can be accomplished by presenting both the additional content and the media content item simultaneously, such that both can be at least partially seen. For example, the additional content is displayed in a pop-up such that it partially obscures (1306) the original content item. In another example, the original content time is shifted such that space is created for the additional content item by moving part of the original content item off screen. In other examples, the display originally includes room for additional content, and the original content item does not need to be displaced or partially covered up.

Figure 14:
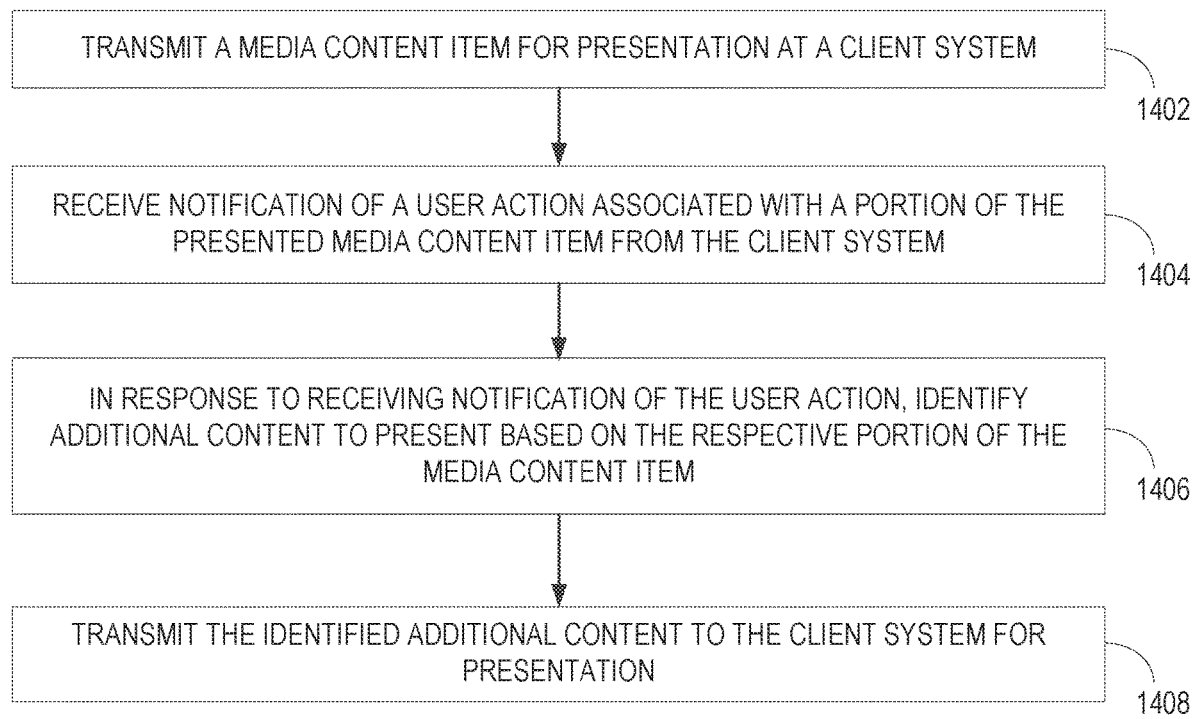
FIG. 14 is a flow diagram illustrating a process for surfacing additional content based on user interaction with currently presented content in accordance with some implementations.

FIG. 14 is a flow diagram illustrating a process for surfacing additional content based on user interaction with currently presented content in accordance with some implementations. Each of the operations shown in FIG. 14 may correspond to instructions stored in a computer memory or computer readable storage medium. Optional operations are indicated by dashed lines (e.g., boxes with dashed-line borders). In some implementations, the method described in FIG. 14 is performed by the server system (e.g., networked sever system 102 on FIG. 1).

In some implementations the method is performed at a server system including one or more processors and memory storing one or more programs for execution by the one or more processors. The server system performs the steps of the method, transmits the data to a client system for presentation, and then receives communications from the client system to notify the server system of user actions.

In some implementations, the server system transmits (1402) a media content item for presentation at a client system. For example, the server system streams video content to the client system. In response, the server system receives (1404) notification of a user action associated with a portion of the presented media content item from the client system. For example, when the user changes the page of an e-book, the client system sends a notification to the server system.

In response to receiving notification of the user action, the server system identifies (1406) additional content to present based on the respective portion of the media content item. The server system then transmits (1408) the identified additional content to the client system for simultaneous presentation along with the original media content item.

Figure 15:
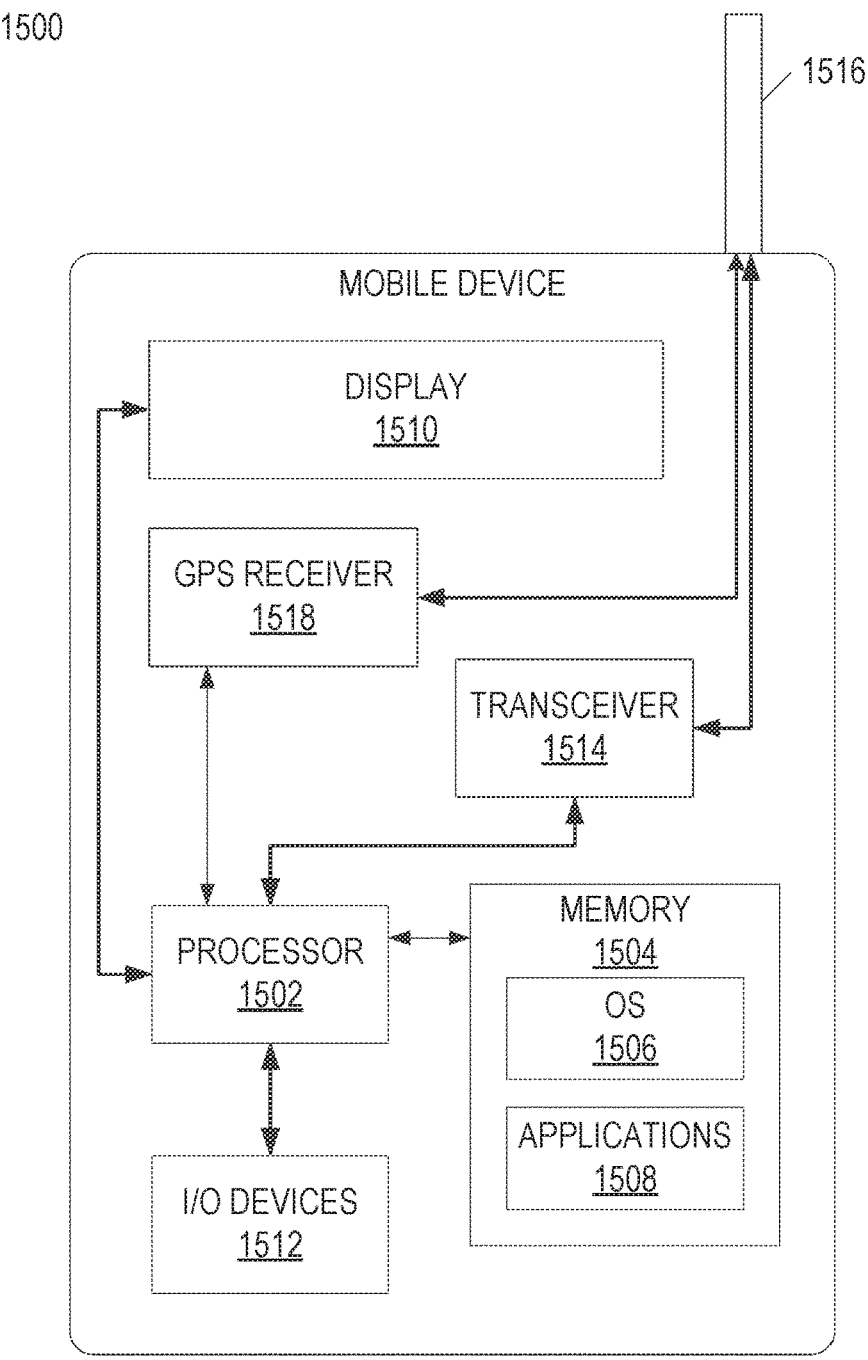
FIG. 15 is a block diagram illustrating a mobile device 1500, according to an example implementation.

FIG. 15 is a block diagram illustrating a mobile device 1500, according to an example implementation. The mobile device 1500 may include a processor 1502. The processor 1502 may be any of a variety of different types of commercially available processors suitable for mobile devices (for example, an XScale architecture microprocessor, a Microprocessor without Interlocked Pipeline Stages (MIPS) architecture processor, or another type of processor). A memory 1504, such as a random access memory (RAM), a Flash memory, or other type of memory, is typically accessible to the processor. The memory 1504 may be adapted to store an operating system (OS) 1506, as well as application programs 1508, such as a mobile location enabled application that may provide Location Based Services (LBSs) to a user. The processor 1502 may be coupled, either directly or via appropriate intermediary hardware, to a display 1510 and to one or more input/output (I/O) devices 1512, such as a keypad, a touch panel sensor, a microphone, and the like. Similarly, in some implementations, the processor 1502 may be coupled to a transceiver 1514 that interfaces with an antenna 1516. The transceiver 1514 may be configured to both transmit and receive cellular network signals, wireless data signals, or other types of signals via the antenna 1516, depending on the nature of the mobile device 1500. Further, in some configurations, a GPS receiver 1518 may also make use of the antenna 1516 to receive GPS signals.

Figure 16:
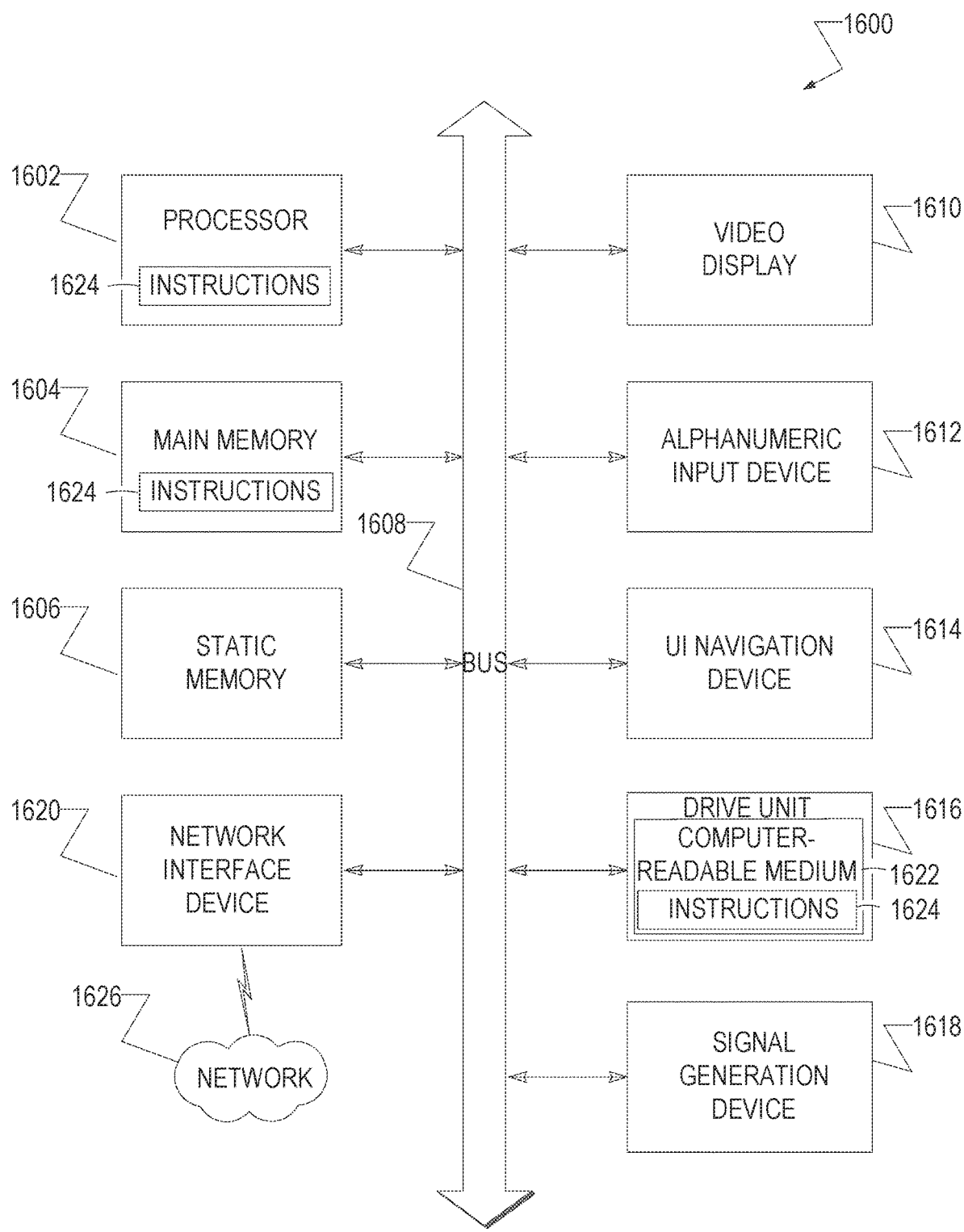
FIG. 16 is a block diagram illustrating components of a machine 1600, according to some example implementations.

FIG. 16 is a block diagram illustrating components of a machine 1600, according to some example implementations, able to read instructions 1624 from a machine-readable medium 1622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 16 shows the machine 1600 in the example form of a computer system (e.g., a computer) within which the instructions 1624 (e.g., software, a program, an application, an applet, an app, or other executable code) for causing the machine 1600 to perform any one or more of the methodologies discussed herein may be executed, in whole or in part.

In alternative implementations, the machine 1600 operates as a standalone device or may be connected (e.g., networked) to other machines. In a networked deployment, the machine 1600 may operate in the capacity of a server machine or a client machine in a server-client network environment, or as a peer machine in a distributed (e.g., peer-to-peer) network environment. The machine 1600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include any collection of machines that individually or jointly execute the instructions 1624 to perform all or part of any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The processor 1602 may contain microcircuits that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein.

The machine 1600 may further include a video display 1610 (e.g., a plasma display panel (PDP), a light emitting diode (LED) display, a liquid crystal display (LCD), a projector, a cathode ray tube (CRT), or any other display capable of displaying graphics or video). The machine 1600 may also include an alphanumeric input device 1612 (e.g., a keyboard or keypad), a UI navigation device 1614 (e.g., a mouse, a touchpad, a trackball, a joystick, a motion sensor, an eye tracking device, or other pointing instrument), a storage unit 1616, an signal generation device 1618 (e.g., a sound card, an amplifier, a speaker, a headphone jack, or any suitable combination thereof), and a network interface device 1620.

The storage unit 1616 includes the machine-readable medium 1622 (e.g., a tangible and non-transitory machine-readable storage medium) on which are stored the instructions 1624 embodying any one or more of the methodologies or functions described herein. The instructions 1624 may also reside, completely or at least partially, within the main memory 1604, within the processor 1602 (e.g., within the processor's cache memory), or both, before or during execution thereof by the machine 1600. Accordingly, the main memory 1604 and the processor 1602 may be considered machine-readable media (e.g., tangible and non-transitory machine-readable media). The instructions 1624 may be transmitted or received over the network 1626 via the network interface device 1620. For example, the network interface device 1620 may communicate the instructions 1624 using any one or more transfer protocols (e.g., hypertext transfer protocol (HTTP)).

In some example implementations, the machine 1600 may be a portable computing device, such as a smart phone or tablet computer, and have one or more additional input components (e.g., sensors or gauges). Examples of such input components 1630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, RAM), read-only memory (ROM, buffer memory, flash memory, and cache memory. While the machine-readable medium 1622 is shown in an example implementation to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1624 for execution by the machine 1600, such that the instructions 1624, when executed by one or more processors of the machine 1600 (e.g., processor 1602), cause the machine 1600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example implementations, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some implementations, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In implementations in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain operations may be distributed among the one or more processors, not only residing within a single machine, but deployed across a number of machines. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method, comprising:
   detecting a user action that includes a physical movement of the user occurring during a particular portion of a media content item that is being shown on a display screen of an electronic device, wherein the physical movement does not include directly selecting any portion of digital content of the media content item; and
   in response to determining that the particular portion of the digital content is associated with the physical movement:
      analyzing the particular portion to identify one or more images that are included in the particular portion that is displayed on the display screen when the user action is detected;
      accessing a digital record including user information regarding a user of the electronic device;
      based on an analysis of the one or more images and an analysis of the user information, determining one or more topics associated with the particular portion of the media content item;
      based on the determined one or more topics, identifying an additional digital content item corresponding to at least one of the one or more topics;
      accessing the additional digital content item; and
      simultaneously displaying the additional digital content item along with the media content item on the display screen of the electronic device.

2. The method of claim 1, wherein detecting the physical movement includes using input from a global positioning system.

3. The method of claim 1, wherein detecting the physical movement includes using input from a motion detection component.

4. The method of claim 1, wherein detecting the physical movement includes using input from a camera.

5. The method of claim 4, wherein detecting the physical movement includes:
   detecting, using the input from the camera, a change in an eye position of the user of the electronic device from a first eye position to a second eye position; and
   based on the second eye position, determining a gaze point on the display screen of the electronic device.

6. The method of claim 1, wherein identifying the additional digital content item includes selecting, based on the analysis of the particular portion of the digital content, a set of one or more additional content items.

7. The method of claim 6, wherein identifying the additional digital content item further includes ranking, based on the analysis of the user information, the set of one or more additional content items.

8. The method of claim 1, wherein the user information includes one or more of age, gender, location or interests of the user.

9. The method of claim 1, wherein the additional digital content item is preselected and associated with the media content item prior to display of the media content item.

10. The method of claim 1, further comprising:
    retrieving the user information from a larger digital record, wherein at least a portion of the larger digital record is omitted from the user information in accordance with one or more applicable privacy policies.

11. An electronic device, comprising:
    a processor;
    a display device; and
    a non-transitory computer-readable medium having stored thereon instructions that are executable to cause the electronic device to perform operations comprising:
       detecting a user action, including detecting a physical movement of the user, occurring during a particular portion of a media content item that is being shown on the display device, wherein the physical movement does not include directly selecting any portion of digital content of the media content item; and
       in response to determining that the particular portion of the digital content is associated with the detected physical movement:
          analyzing the particular portion to identify one or more images that are included in the particular portion that is displayed on the display device when the user action is detected;
          accessing a digital record including user information regarding a user of the electronic device;
          based on an analysis of the one or more images and an analysis of the user information, determining one or more topics associated with the particular portion of the media content item;
          based on the determined one or more topics, identifying a particular additional digital content item corresponding to at least one of the one or more topics;
          accessing the particular additional digital content item; and
          simultaneously displaying the particular additional digital content item along with the media content item on the display device.

12. The electronic device of claim 11, wherein the operations further comprise:
    making a content type determination, based on a type of the media content item, whether a single additional digital content item should be shown or whether multiple additional digital content items should be shown; and
    based on the content type determination indicating that multiple content item displays are allowed, displaying a second additional digital content items, including the particular additional digital content item, along with the media content item.

13. The electronic device of claim 11, wherein the operations further comprise:
    determining whether a single additional digital content item should be shown or whether multiple additional digital content items should be shown based on an amount of available space on the display device.

14. The electronic device of claim 11, wherein the user information includes past purchasing activity stored in a user profile that is associated with the user.

15. The electronic device of claim 11, wherein the user information includes past media consumption activity for the user.

16. A non-transitory computer readable medium having instructions stored thereon that are executable by a computing system to cause the computing system to perform operations comprising:
    detecting a user action, including detecting a physical movement of the user, occurring during a particular portion of a media content item that is being shown on a display screen of an electronic device, wherein the physical movement does not include directly selecting any portion of digital content of the media content item; and in response to determining that the particular portion of the digital content associated with the detected physical movement:
- analyzing the particular portion to identify one or more images that are included in the particular portion that is displayed on the display screen when the user action is detected;
- accessing a digital record including user information regarding a user of the electronic device;
- based on an analysis of the one or more images and an analysis of the user information, determining a particular additional digital content item corresponding to at least one of one or more topics corresponding to the particular portion of the digital content;
- accessing the particular additional digital content item; and
- simultaneously displaying the particular additional digital content item along with the media content item on the display screen of the electronic device.

17. The non-transitory computer readable medium of claim 16, wherein the particular additional digital content item includes audio content, and wherein simultaneously displaying the particular additional digital content item includes playing the audio content.

18. The non-transitory computer readable medium of claim 16, wherein detecting the physical movement includes:
- detecting a change in an eye position of the user from a first eye position to a second eye position; and
- determining gaze point on the display screen based on the second eye position.

19. The non-transitory computer readable medium of claim 16, wherein the operations further comprise:
- making a content type determination, based on a type of the media content item, whether a single additional digital content item should be shown or whether multiple additional digital content items should be shown; and
- based on the content type determination indicating that multiple content item displays are allowed, displaying a second additional digital content items, including the particular additional digital content item, along with the media content item.

20. The non-transitory computer readable medium of claim 16, wherein the operations further comprise:
- determining whether a single additional digital content item should be shown or whether multiple additional digital content items should be shown based on an amount of available space on the display screen.

* * * * *